United States Patent
Cui et al.

(10) Patent No.: US 12,212,861 B2
(45) Date of Patent: Jan. 28, 2025

(54) PIXELATED PROGRAMMABLE NEUTRAL DENSITY FILTER ARRAY

(71) Applicant: QUALCOMM Incorporated, San Diego, CA (US)

(72) Inventors: Nan Cui, San Diego, CA (US); Wenbin Wang, San Diego, CA (US); Zuguang Xiao, San Diego, CA (US); Zhi Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/302,483

(22) Filed: May 4, 2021

(65) Prior Publication Data

US 2022/0360750 A1    Nov. 10, 2022

(51) Int. Cl.
 *H04N 25/13* (2023.01)

(52) U.S. Cl.
 CPC ..... *H04N 25/135* (2023.01); *H04N 2209/043* (2013.01)

(58) Field of Classification Search
 CPC .. H04N 5/2226; H04N 5/332; H04N 9/04553; H04N 9/04559; H04N 9/04557; H04N 2209/043; H04N 23/741; H04N 25/135; G06T 2207/20208; G06T 5/009; G06T 5/50; G06T 5/92
 See application file for complete search history.

(56) References Cited

U.S. PATENT DOCUMENTS

| | | | |
|---|---|---|---|
| 2005/0089136 A1* | 4/2005 | Toth | A61B 6/544 378/16 |
| 2005/0275838 A1* | 12/2005 | Hoot | G01J 3/40 356/305 |
| 2007/0242141 A1 | 10/2007 | Ciurea | |
| 2017/0243373 A1* | 8/2017 | Bevensee | G03B 35/10 |
| 2020/0133015 A1* | 4/2020 | Urzhumov | G02B 27/0961 |
| 2020/0344430 A1 | 10/2020 | Wang et al. | |
| 2022/0044407 A1* | 2/2022 | Liu | G06T 7/11 |

OTHER PUBLICATIONS

Hidetoshi M., et al., "High Dynamic Range Camera using Reflective Liquid Crystal", ICCV 2007, IEEE 11th International Conference On Computer Vision, 2007, [Online] Oct. 21, 2007, pp. 1-8, XP055925953, DOI: 10.1109/ICCV.2007.4408992, ISBN: 978-1-4244-1630-1.

International Search Report and Written Opinion—PCT/US2022/071043—ISA/EPO—Jun. 9, 2022.

* cited by examiner

*Primary Examiner* — Antoinette T Spinks
(74) *Attorney, Agent, or Firm* — QUALCOMM Incorporated (57) ABSTRACT

In some aspects, a device may receive, from a pixel array of a camera, a first image. The device may configure, based at least in part on the first image, a setting of a filter. The filter may be included within a filter array that is arranged within the camera in association with the pixel array. The device may cause the pixel array to capture a second image. Numerous other aspects are described.

30 Claims, 5 Drawing Sheets

PIXELATED PROGRAMMABLE NEUTRAL DENSITY FILTER ARRAY

FIELD OF THE DISCLOSURE

Aspects of the present disclosure generally relate to filters and, for example, to pixelated programmable neutral density filter arrays.

BACKGROUND

In photography and optics, a neutral density (ND) filter reduces or modifies the intensity of all wavelengths, or colors, of light equally with no changes in hue of color rendition. For example, an ND filter may be used to reduce an amount of light entering a lens of a camera to allow combinations of aperture, exposure time, and sensor sensitivity settings that otherwise would produce overexposed pictures.

SUMMARY

In some aspects, a method comprises receiving, by a device and from a pixel array of a camera, a first image; configuring, by the device and based at least in part on the first image, a setting of a filter, wherein the filter is included within a filter array that is arranged within the camera in association with the pixel array; and causing, by the device, the pixel array to capture a second image.

In some aspects, a device includes one or more memories, and one or more processors, coupled to the one or more memories, configured to receive, from a pixel array of a camera, a first image; configure, based at least in part on the first image, a setting of a filter, wherein the filter is included within a filter array that is arranged within the camera in association with the pixel array; and cause the pixel array to capture a second image.

In some aspects, a non-transitory computer-readable medium storing a set of instructions includes one or more instructions that, when executed by one or more processors of a device, cause the device to receive, from a pixel array of a camera, a first image; configure, based at least in part on the first image, a setting of a filter, wherein the filter is included within a filter array that is arranged within the camera in association with the pixel array; and cause the pixel array to capture a second image.

In some aspects, an apparatus includes means for receiving, from a pixel array of a camera, a first image; means for configuring, based at least in part on the first image, a setting of a filter, wherein the filter is included within a filter array that is arranged within the camera in association with the pixel array; and means for causing the pixel array to capture a second image.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In photography, "dynamic range" may refer to a contrast or color range between the lightest and darkest tones in an image, a scene captured by a camera, and/or the like. Commonly, the dynamic range of a natural scene (e.g., a sunset, a sunrise, a mountain, a lake, and/or the like) may be large (e.g., up to 140 db) relative to a dynamic range that can be captured by an image sensor of a camera (e.g., up to 90 db). To capture the relatively large dynamic range of a scene, a camera may be configured to capture multiple (e.g., 3, 4, 5, and/or the like) images of the scene using different exposure times. For example, the camera may use a long exposure time (e.g., 0.5 seconds, 1.0 seconds, 3.0 seconds, and/or the like) to capture dark tones of the scene, and a short exposure time (e.g., 1.0 microseconds, 5.0 microseconds, and/or the like) to capture light tones of the scene. The camera may align and/or combine the multiple images to generate a high dynamic range (HDR) image of the scene (e.g., an HDR image).

However, because the multiple images are captured at different times, a position of an object in one image of the scene may be different from the position of the object in another image of the scene. The different positions of the object may prevent the multiple images from being properly aligned. As a result, combining the multiple images may cause an image artifact (e.g., a feature, a distortion, and/or the like that appears in the generated HDR image of the scene that is not present in the actual scene) to be present in the HDR image of the scene.

Some implementations described herein enable a camera to utilize a single exposure time to capture an HDR image of a scene. For example, the camera may include a pixel array formed on a surface of an image sensor. A corresponding filter array may be positioned over the pixel array such that each filter is positioned over a respective pixel of the pixel array. Each filter may be communicatively coupled to the image sensor to allow an amount of light attenuated by each filter to be individually programmable. When the camera is activated by a user, the camera may generate a preview image that is displayed to the user. The camera may analyze the preview image to determine whether each filter is to attenuate light and, if so, an amount of light to be attenuated by each filter of the filter array. The camera may configure each filter based on determining whether the filter is to attenuate light and/or an amount of light to be attenuated by the filter. The camera may capture an image of a scene based at least in part on configuring each filter of the filter array.

In this way, an HDR image of a scene can be generated based on a single image without overexposure and/or underexposure of the image. By generating the HDR image of the scene based on a single image, the camera may prevent image artifacts that may otherwise appear in an image generated based on combining multiple images captured using different exposure times. Further, the camera may conserve computing resources (e.g., processor resources, memory resources, communication resources, and/or the like) that otherwise would have been utilized to store the multiple images, align the multiple images, combine the multiple images, and/or the like.

Figure 1:
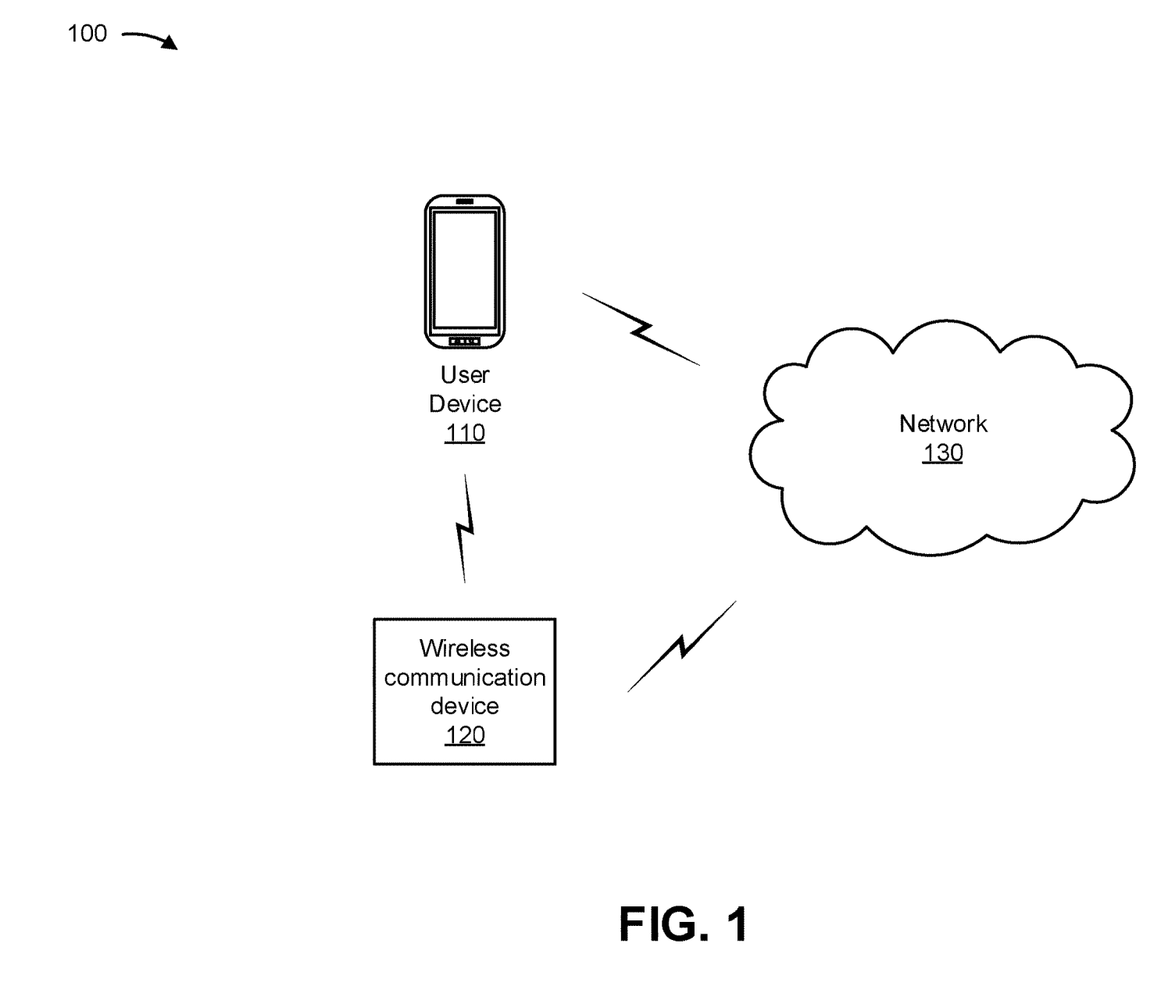
FIG. 1 is a diagram illustrating an example environment in which a pixelated programmable neutral density filter array described herein may be implemented, in accordance with the present disclosure.

FIG. 1 is a diagram of an example environment 100 in which systems and/or methods described herein may be implemented. As shown in FIG. 1, environment 100 may include a user device 110, a wireless communication device 120, and a network 130. Devices of environment 100 may interconnect via wired connections, wireless connections, or a combination of wired and wireless connections.

The user device 110 includes one or more devices capable of receiving, generating, storing, processing, and/or providing information associated with a pixelated programmable neutral density filter array, as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Similar to the user device 110, the wireless communication device 120 includes one or more devices capable of receiving, generating, storing, processing, and/or providing information associated with one or more devices described herein. For example, the wireless communication device 120 may include a base station, an access point, and/or the like. Additionally, or alternatively, similar to the user device 110, the wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

The network 130 includes one or more wired and/or wireless networks. For example, the network 130 may include a cellular network (e.g., a long-term evolution (LTE) network, a code division multiple access (CDMA) network, a 3G network, a 4G network, a 5G (New Radio) network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, the network 130 may include a data network and/or be communicatively with a data platform (e.g., a web-platform, a cloud-based platform, a non-cloud-based platform, and/or the like) that is capable of receiving, generating, processing, and/or providing information associated with a pixelated programmable neutral density filter array, as described elsewhere herein.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
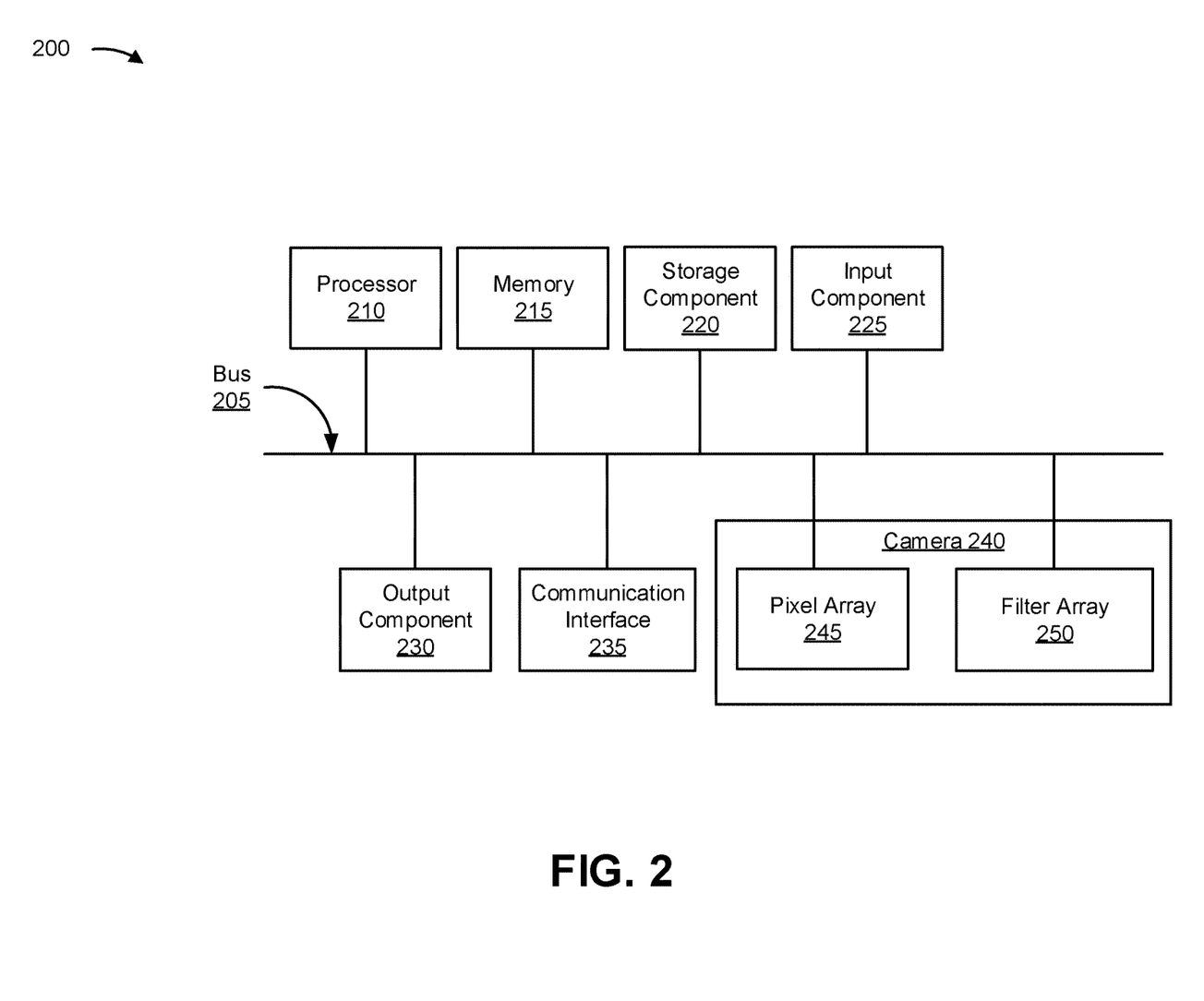
FIG. 2 is a diagram illustrating example components of one or more devices shown in FIG. 1, such as a user device 110 and/or a wireless communication device 120, in accordance with the present disclosure.

FIG. 2 is a diagram illustrating example components of a device 200, in accordance with the present disclosure. Device 200 may correspond to user device 110 and/or wireless communication device 120. In some aspects, user device 110 and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, and/or a camera 240.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope (e.g., a micro-electro-mechanical system (MEMS) gyroscope or a similar type of device), an actuator, an accelerometer, a speed sensor, a motion sensor, an infrared sensor, a temperature sensor, a pressure sensor, or another type of position or environment sensor).

In some aspects, the sensor may include one or more integrated circuits (e.g., on a packaged silicon die) and/or one or more passive components of one or more flex circuits to enable communication with one or more components of device 200. In some aspects, the sensor may include an optical sensor that has a field of view in which the sensor may determine one or more characteristics of an environment of device 200. Additionally, or alternatively, the sensor may include a light sensor (e.g., a complementary metal oxide semiconductor (CMOS) sensor, a charge coupled device (CCD) sensor, and/or the like), magnetometer (e.g., a Hall effect sensor, an anisotropic magnetoresistive (AMR) sensor, a giant magneto-resistive sensor (GMR), and/or the like), and/or the like.

Output component 230 includes a component that provides output information from device 200 (e.g., a display, a speaker, a haptic feedback component, and/or an audio or visual indicator). Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Camera 240 includes one or more devices capable of capturing images, such as one or more still images and/or a sequence of images that form a video. For example, camera 240 may include a still camera (e.g., a digital camera), a video camera (e.g., a digital video camera), and/or the like. In some aspects, camera 240 may be movable and/or may include a movable lens, and camera 240 and/or the lens may move (e.g., orient, zoom, and/or focus) automatically based on internal functionality (e.g., for identification, tracking, and/or the like) and/or instructions from another device (e.g., processor 210).

In some aspects, as shown in FIG. 2, camera 240 includes a pixel array 245 and a filter array 250. The pixel array 245 may include an array of microscopic light sensors (e.g., a photodiode, a photodetector, and/or the like) built into an image sensor, such as a charge-coupled device (CCD), a complementary metal oxide semiconductor (CMOS) sensor, and/or the like. The pixel array 245 may be configured to receive light propagating through an aperture of the camera 240 and to convert the light into current. The image sensor may determine one or more characteristics (e.g., an amount and/or a wavelength (e.g., color)) of light received at a pixel based at least in part on the current generated by the pixel. The image sensor may generate a digital pixel for the pixel based at least in part on the one or more characteristics of the light. The camera 240 may generate an image of a scene based at least in part on the digital pixels generated for each pixel of the pixel array 245.

The filter array 250 may include an array of filters configured to selectively attenuate light entering via an aperture of the camera 240 and/or received by the pixel array 245. For example, the filter array 250 may include an array of ND filters and/or another type of filter configured to attenuate light. The filter array 250 may be connected to the image sensor of the camera 240 to enable an amount of light attenuated by each filter to be individually programmable (e.g., by processor 210) to attenuate light received by a pixel, as described herein.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for receiving, from a pixel array of a camera, a first image; means for configuring, based at least in part on the first image, a setting of a filter, wherein the filter is included within a filter array that is arranged within the camera in association with the pixel array; and means for causing the pixel array to capture a second image. In some aspects, such means may include one or more components of device 200 described in connection with FIG. 2, such as bus 205, processor 210, memory 215, storage component 220, input component 225, output component 230, communication interface 235, and/or camera 240.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
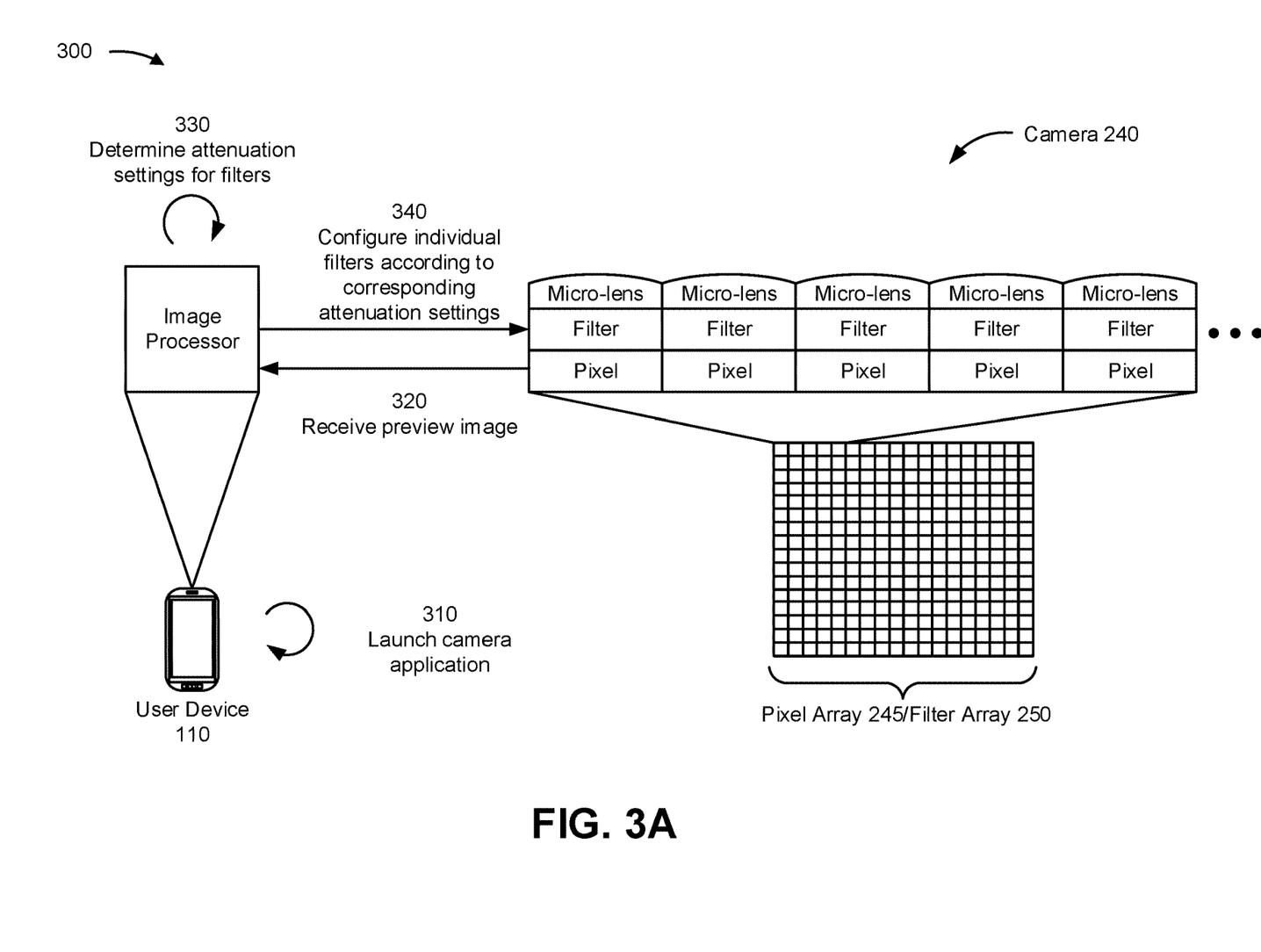
FIGS. 3A-3B are diagrams illustrating examples associated with a pixelated programmable neutral density filter array, in accordance with the present disclosure.
Figure 3B:
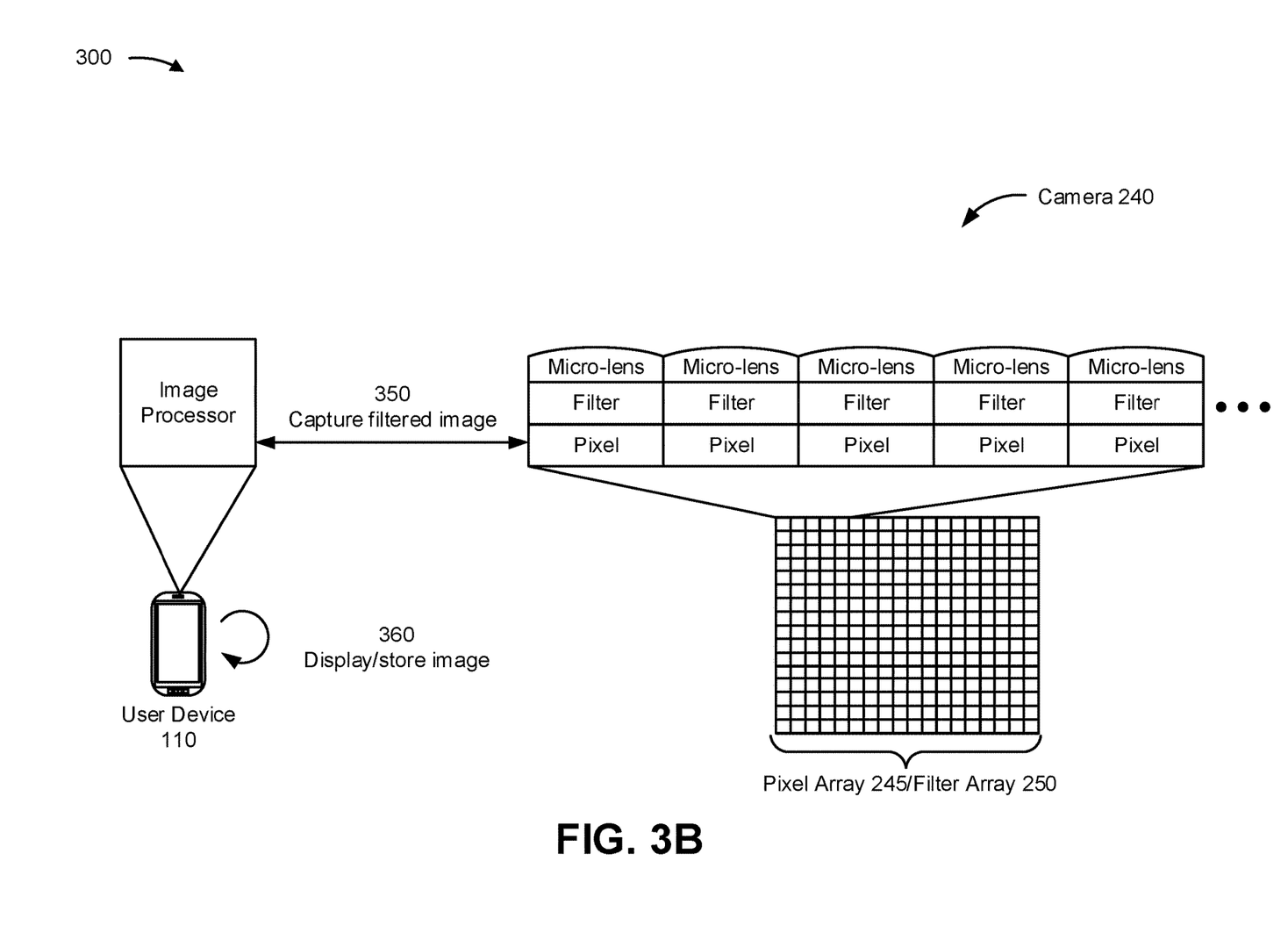

FIGS. 3A-3B are diagrams illustrating an example 300 associated with a pixelated programmable filter array, in accordance with the present disclosure. As shown in FIGS. 3A-3B, a user device 110 includes a camera 240 that is configured to capture an image of a scene based on signals transmitted by an image processor, as described herein. As shown in FIG. 3A, the camera 240 includes a pixel array 245, a filter array 250, and a plurality of micro-lenses.

The pixel array 245 may include a plurality of pixels arranged in a grid and/or formed in an image sensor (e.g., a CCD, a CMOS sensor, and/or the like) of the camera 240. The filter array 250 may include a plurality of filters arranged in a grid such that each filter of the filter array 250 is positioned in front of a respective pixel of the pixel array 245. In some aspects, the filter array 250 includes a plurality of ND filters. Similarly, the plurality of micro-lenses may be arranged in a grid such that each micro lens is positioned in front of a respective filter and/or pixel and/or positioned to focus a portion of light propagating through an aperture of the camera 240 onto and through a filter and onto a pixel of the pixel array 245.

As shown by reference number 310, the user device 110 launches a camera application. For example, the user device 110 may launch the camera application based on receiving an input by a user of the user device 110. The camera application may be associated with a user interface that allows the user to control the camera 240 to capture an image of a scene, to view a preview image of the scene, to edit or manipulate a captured image, and/or the like.

As shown by reference number 320, the image processor receives a preview image. In some aspects, the image processor receives the preview image based on launching the application. The preview image may depict a scene or physical environment that is to be captured, as an image, by the camera 240. For example, the image processor may cause an aperture of the camera 240 to be opened based at least in part on launching the camera application. Light may propagate through the aperture to the plurality of micro-lenses. The plurality of micro-lenses may focus the light through the filter array 250 and onto the pixels of the pixel array 245.

In some aspects, the pixels of the pixel array 245 receive unfiltered light. For example, the image processor may cause a setting of the filters of the filter array 250 to be set to a default setting based at least in part on the image processor launching the application. The filters of the filter array 250 may not attenuate light propagating through the filters, based at least in part on the setting being set to the default setting. In some aspects, the preview image may comprise a low dynamic range image (e.g., an image having a dynamic range less than 90 dB).

The pixels of the pixel array 245 may sense one or more characteristics (e.g., an intensity, an amount, an amplitude, a frequency, a wavelength, a color, and/or the like) of the light (e.g., a light wave) received by the pixels and may provide respective information identifying the one or more characteristics to the image processor. The image processor may generate the preview image based on the information received from the pixels of the pixel array 245.

As an example, a pixel of the pixel array 245 may generate an electrical signal based at least in part on receiving a portion of the light propagating through the aperture. The electrical signal may be converted (e.g., by the image sensor) into a digital pixel that is provided to the image processor. The image processor may determine the one or more characteristics of the light received by the pixel based on the digital pixel. The image processor may identify a pixel of a display of the user device 110 associated with the pixel of the pixel array 245. The image processor may cause the identified pixel to be illuminated based on the one or more characteristics of the light received by the pixel of the pixel array 245.

In some aspects, the image processor may receive the preview image and/or cause the preview image to be displayed based at least in part on a mode of operation associated with the camera 240. For example, the user may provide an input via the user interface associated with the camera application (e.g., the user may select an input element displayed via the user interface). The image processor may receive the input and may cause the camera 240 to transition to a preview mode based at least in part on the input. The image processor may receive the preview image based at least in part on the camera 240 transitioning to and/or being in the preview mode.

In some aspects, the preview image includes a plurality of images (e.g., a video). For example, the image processor may receive a stream of data (e.g., digital pixels) from the image sensor and/or the pixel array 245 based on the camera transitioning to the preview mode. The image processor may cause pixels of a display of the user device 110 to be illuminated based on the stream of data to cause the preview image to be displayed to the user.

As shown by reference number 330, the image processor determines attenuation settings for filters. The attenuation setting for a filter may correspond to a light attenuation level associated with the filter (e.g., an amount of light to be attenuated by the filter). The image processor may determine the attenuation settings for the filter based on pixel characteristics associated with the pixel array 245 and/or a pixel adjacent to (e.g., behind) the filter.

In some aspects, the pixel characteristics may be indicated in the preview image based at least in part on the pixel sensing the characteristic. For example, the pixel characteristics may include a dynamic range of the preview image, an intensity of a light wave received by the pixel, an amount of light received by the pixel, an amplitude of a light wave received by the pixel, a frequency of a light wave received by the pixel, a wavelength of a light wave received by the pixel, a color of light received by the pixel, and/or the like. In some aspects, the attenuation setting determined for a first filter of the filter array 250 is different from an attenuation setting determined for a second filter of the filter array 250.

Alternatively, and/or additionally, the image processor may determine an attenuation setting for a filter based on a user input. For example, the user may input information (e.g., via the user interface associated with the camera application) indicating a portion (e.g., a background, a foreground, a particular object, and/or the like) of the image to be attenuated, a color to be attenuated, a portion of the image that is not to be attenuated, an amount of attenuation to be applied to a portion of the image, and/or the like. The image processor may determine an attenuation setting for one or more filters of the filter array 250 based on the user input.

As shown by reference number 340, the image processor configures individual filters according to corresponding attenuation settings determined for the filters. In some aspects, the filter array 250 is formed from a liquid crystal layer that is disposed between the pixel array 245 and the aperture of the camera 240. The image processor may configure one or more individual filters of the filter array 250 based at least in part on controlling a position of one or more liquid crystals, of the liquid crystal layer, that form the one or more individual filters.

As shown in FIG. 3B, and by reference number 350, the camera 240 captures the filtered image. In some aspects, the camera 240 captures the filtered image based on a user input. For example, a user may select an input element displayed via the user interface associated with the camera application, a physical button included on the user device 110, and/or the like to cause the camera 240 to capture an image of the physical environment. The filters of the filter array 250 may attenuate light propagating through the aperture of the camera based at least in part on the respective attenuation settings configured for each of the filters.

The camera 240 may generate the filtered image based at least in part on the filters of the filter array 250 attenuating the light propagating through the aperture of the camera 240. The filtered image may comprise an HDR image that is captured utilizing a single exposure time (e.g., an HDR image that is captured during a time period of a single exposure). As shown by reference number 360, the image processor displays (e.g., via a display associated with the user device 110 and/or the camera 240) and/or stores the image in a memory associated with the user device 110 and/or the camera 240.

In this way, an HDR image can be generated based on a single image captured utilizing a single exposure time without over exposure and/or under exposure of the image. By generating the HDR image based on a single image, the camera 240 may prevent image artifacts that may otherwise appear in an image generated based on combining multiple images captured using different exposure times. Further, the camera 240 may conserve computing resources that otherwise would have been utilized to store multiple images, align the multiple images, and/or combine the multiple images to form the HDR image.

As indicated above, FIGS. 3A-3B are provided as an example. Other examples may differ from what is described with respect to FIGS. 3A-3B.

Figure 4:
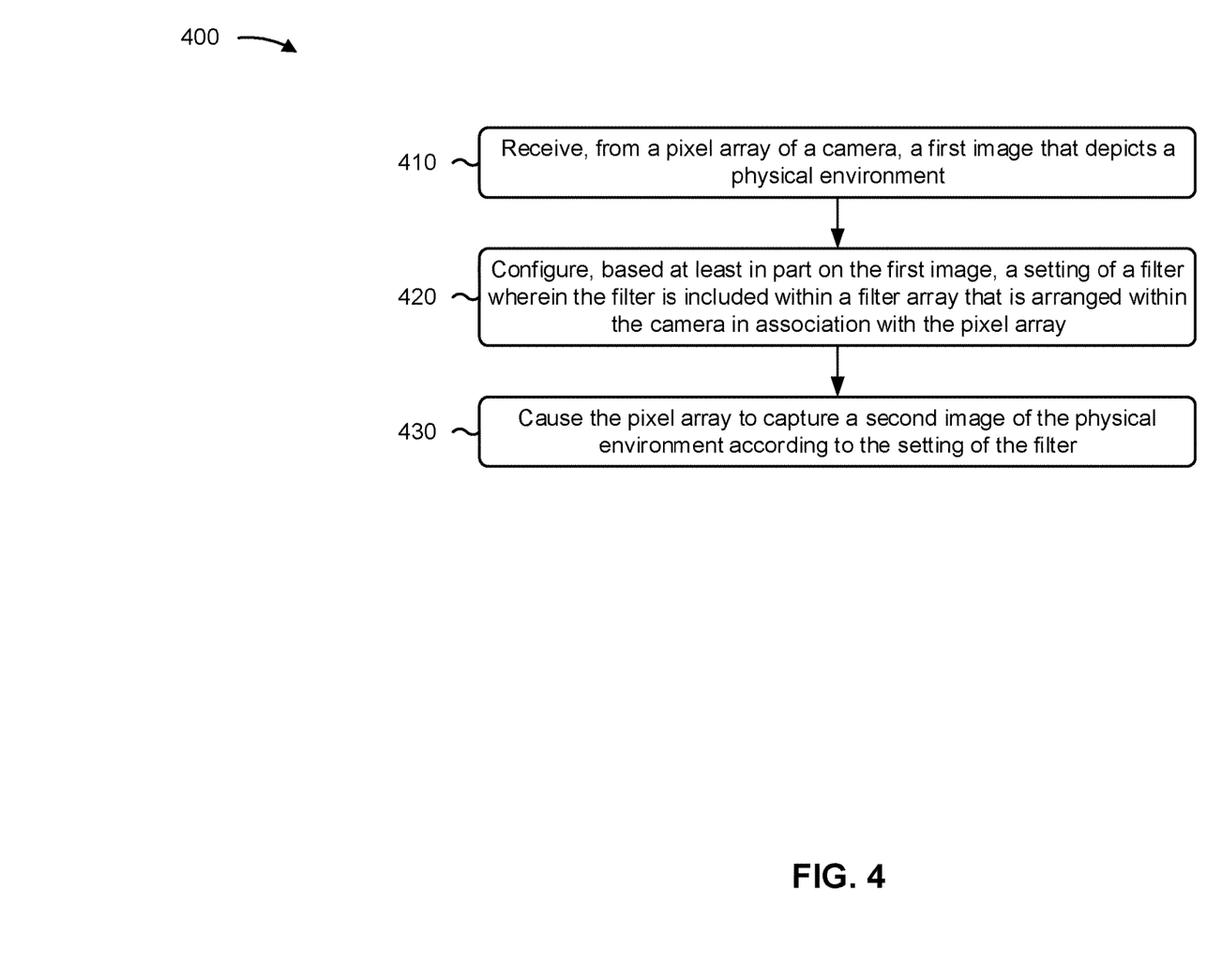
FIG. 4 is a flowchart of example processes associated with a pixelated programmable neutral density filter array, in accordance with the present disclosure.

FIG. 4 is a diagram illustrating an example process 400 performed, for example, by a device, in accordance with the present disclosure. Example process 400 is an example where the device (e.g., user device 110 and/or wireless communication device 120) performs operations associated with a pixelated programmable neutral density filter array.

As shown in FIG. 4, in some aspects, process 400 may include receiving, from a pixel array of a camera, a first image that depicts a physical environment (block 410). For example, the device (e.g., using the processor 210, the memory 215, the storage component 220, the input component 225, the output component 230, the communication interface 235, and/or the camera 240) may receive, from a pixel array of a camera, a first image that depicts a physical environment, as described above.

As further shown in FIG. 4, in some aspects, process 400 may include configuring, based at least in part on the first image, a setting of a filter, wherein the filter is included within a filter array that is arranged within the camera in association with the pixel array (block 420). For example, the device (e.g., using the processor 210, the memory 215, the storage component 220, the input component 225, the output component 230, the communication interface 235, and/or the camera 240) may configure, based at least in part on the first image, a setting of a filter, wherein the filter is included within a filter array that is arranged within the camera in association with the pixel array, as described above. In some aspects, the filter is included within a filter array that is arranged within the camera in association with the pixel array.

As further shown in FIG. 4, in some aspects, process 400 may include causing the pixel array to capture a second image of the physical environment according to the setting of the filter (block 430). For example, the device (e.g., using the processor 210, the memory 215, the storage component 220, the input component 225, the output component 230, the communication interface 235, and/or the camera 240) may cause the pixel array to capture a second image of the physical environment according to the setting of the filter, as described above.

Process 400 may include additional aspects, such as any single aspect or any combination of aspects described below and/or in connection with one or more other processes described elsewhere herein.

In a first aspect, the first image is received based at least in part on the camera being in a preview mode.

In a second aspect, alone or in combination with the first aspect, the first image comprises a low dynamic range image and the second image comprises a high dynamic range image.

In a third aspect, alone or in combination with one or more of the first and second aspects, the setting corresponds to a light attenuation level that is configured based at least in part on a characteristic of a light wave, wherein the characteristic is indicated in the first image based at least in part on a pixel of the pixel array sensing the characteristic.

In a fourth aspect, alone or in combination with one or more of the first through third aspects, the pixel is positioned within the pixel array in a pixel location that is correlated with a filter location, of the filter, within the filter array.

In a fifth aspect, alone or in combination with one or more of the first through fourth aspects, the characteristic comprises at least one of a frequency of the light wave or an amplitude of the light wave.

In a sixth aspect, alone or in combination with one or more of the first through fifth aspects, the filter array comprises an array of neutral density filters, and the filter is at least one of the neutral density filters.

In a seventh aspect, alone or in combination with one or more of the first through sixth aspects, data of the second image depicts a portion of the physical environment according to the setting of the filter, wherein the pixel data is associated with a pixel of the pixel array that is arranged in a pixel location of the pixel array that corresponds to a filter location of the filter within the filter array.

In an eighth aspect, alone or in combination with one or more of the first through seventh aspects, process 400 includes configuring, based at least in part on the first image, another setting of another filter of the filter array, wherein the pixel array is caused to capture the second image according to the setting of the filter and the setting of the other filter.

In a ninth aspect, alone or in combination with one or more of the first through eighth aspects, the setting of the filter is a different light attenuation level than a light attenuation level of the other setting of the other filter.

In a tenth aspect, alone or in combination with one or more of the first through ninth aspects, the filter array is formed from a liquid crystal layer that is disposed between the pixel array and an aperture of the camera, and the filter is configured based on controlling a position of one or more liquid crystals, of the liquid crystal layer, that form the filter.

In an eleventh aspect, alone or in combination with one or more of the first through tenth aspects, the second image comprises a high dynamic range image that is captured during a time period of a single exposure.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The following provides an overview of some Aspects of the present disclosure:

Aspect 1: A method comprises receiving, by a device and from a pixel array of a camera, a first image that depicts a physical environment; configuring, by the device and based at least in part on the first image, a setting of a filter, wherein the filter is included within a filter array that is arranged within the camera in association with the pixel array; and causing, by the device, the pixel array to capture a second image of the physical environment according to the setting of the filter.

Aspect 2: The method of Aspect 1, wherein the first image is received based at least in part on the camera being in a preview mode.

Aspect 3: The method of any of Aspects 1 and 2, wherein the first image comprises a low dynamic range image and the second image comprises a high dynamic range image.

Aspect 4: The method of any of Aspects 1 through 3, wherein the setting corresponds to a light attenuation level that is configured based at least in part on a characteristic of a light wave, wherein the characteristic is indicated in the first image based at least in part on a pixel of the pixel array sensing the characteristic.

Aspect 5: The method of Aspect 4, wherein the pixel is positioned within the pixel array in a pixel location that is correlated with a filter location, of the filter, within the filter array.

Aspect 6: The method of Aspect 4, wherein the characteristic comprises at least one of a frequency of the light wave or an amplitude of the light wave.

Aspect 7: The method of any of Aspects 1 through 6, wherein the filter array comprises an array of neutral density filters, and the filter is at least one of the neutral density filters.

Aspect 8: The method of any of Aspects 1 through 7, wherein pixel data of the second image depicts a portion of the physical environment according to the setting of the filter, wherein the pixel data is associated with a pixel of the pixel array that is arranged in a pixel location of the pixel array that corresponds to a filter location of the filter within the filter array.

Aspect 9: The method of any of Aspects 1 through 8, further comprising configuring, based at least in part on the first image, another setting of another filter of the filter array, wherein the pixel array is caused to capture the second image according to the setting of the filter and the setting of the other filter.

Aspect 10: The method of Aspect 9, wherein the setting of the filter is a different light attenuation level than a light attenuation level of the other setting of the other filter.

Aspect 11: The method of any of Aspects 1 through 10, wherein the filter array is formed from a liquid crystal layer that is disposed between the pixel array and an aperture of the camera, and wherein the filter is configured based on controlling a position of one or more liquid crystals, of the liquid crystal layer, that form the filter.

Aspect 12: The method of any of Aspects 1 through 11, wherein the second image comprises a high dynamic range image that is captured during a time period of a single exposure.

Aspect 13: An apparatus for wireless communication at a device, comprising a processor; memory coupled with the processor; and instructions stored in the memory and executable by the processor to cause the apparatus to perform the method of one or more of Aspects 1 through 12.

Aspect 14: A device for wireless communication, comprising a memory and one or more processors coupled to the memory, the memory and the one or more processors configured to perform the method of one or more of Aspects 1 through 12.

Aspect 15: An apparatus for wireless communication, comprising at least one means for performing the method of one or more of Aspects 1 through 12.

Aspect 16: A non-transitory computer-readable medium storing code for wireless communication, the code comprising instructions executable by a processor to perform the method of one or more of Aspects 1 through 12.

Aspect 17: A non-transitory computer-readable medium storing a set of instructions for wireless communication, the set of instructions comprising one or more instructions that, when executed by one or more processors of a device, cause the device to perform the method of one or more of Aspects 1 through 12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
receiving, by a device and from a pixel array of a camera, a first image, wherein the first image is received and provided for display based at least in part on the camera being in a preview mode;
configuring, by the device and based at least in part on the first image, a first setting of a first filter, of a plurality of filters included within a filter array;
receiving, by the device, a user input associated with a portion of the first image, the portion of the first image comprising less than an entire portion of the first image, the user input indicating an amount of attenuation to be applied to the portion of the first image;
configuring, by the device and based at least in part on the user input, a second setting of a second filter, of the plurality of filters included in the filter array,
the second filter being associated with the portion of the first image,
the first setting being different than the second setting, and
the filter array being arranged within the camera in association with the pixel array; and
causing, by the device, the pixel array to capture a second image.

2. The method of claim 1, wherein the first image comprises a low dynamic range image and the second image comprises a high dynamic range image.

3. The method of claim 1, wherein the first setting corresponds to a light attenuation level that is configured based at least in part on a characteristic of a light wave,
wherein the characteristic is indicated in the first image based at least in part on a pixel of the pixel array sensing the characteristic.

4. The method of claim 3, wherein the pixel is positioned within the pixel array in a pixel location that is correlated with a filter location, of the first filter, within the filter array.

5. The method of claim 3, wherein the characteristic comprises at least one of:
a frequency of the light wave; or
an amplitude of the light wave.

6. The method of claim 1, wherein the filter array comprises an array of neutral density filters, and the first filter is at least one of the neutral density filters.

7. The method of claim 1, wherein pixel data of the second image depicts a portion of a physical environment according to the first setting of the first filter,
wherein the pixel data is associated with a pixel of the pixel array that is arranged in a pixel location of the pixel array that corresponds to a filter location of the first filter within the filter array.

8. The method of claim 1, further comprising:
configuring, based at least in part on the first image, a third setting of a third filter of the plurality of filters included in the filter array,
wherein the pixel array is caused to capture the second image according to the first setting of the first filter, the second setting of the second filter, and the third setting of the third filter.

9. The method of claim 8, wherein the first setting of the first filter is a different light attenuation level than a light attenuation level of the third setting of the third filter.

10. The method of claim 1, wherein the filter array is formed from a liquid crystal layer that is disposed between the pixel array and an aperture of the camera, and
wherein the first filter is configured based on controlling a position of one or more liquid crystals, of the liquid crystal layer, that form the first filter.

11. The method of claim 1, wherein the second image comprises a high dynamic range image that is captured during a time period of a single exposure.

12. A device, comprising:
one or more memories; and
one or more processors, coupled to the one or more memories, configured to:
receive, from a pixel array of a camera, a first image, wherein the first image is received and provided for display based at least in part on the camera being in a preview mode;
configure, based at least in part on the first image, a first setting of a first filter, of a plurality of filters included within a filter array;
receive a user input associated with a portion of the first image, the portion of the first image comprising less than an entire portion of the first image, the user input indicating an amount of attenuation to be applied to the portion of the first image;
configure, based at least in part on the user input, a second setting of a second filter, of the plurality of filters included in the filter array,
the second filter being associated with the portion of the first image,
the first setting being different from the second setting, and
the filter array being arranged within the camera in association with the pixel array; and
cause the pixel array to capture a second image.

13. The device of claim 12, wherein the first image comprises a low dynamic range image and the second image comprises a high dynamic range image.

14. The device of claim 12, wherein the first setting corresponds to a light attenuation level that is configured based at least in part on a characteristic of a light wave,
wherein the characteristic is indicated in the first image based at least in part on a pixel of the pixel array sensing the characteristic.

15. The device of claim 14, wherein the characteristic comprises at least one of:

a frequency of the light wave, or
an amplitude of the light wave.

16. The device of claim 12, wherein the one or more processors are further configured to:
configure, based at least in part on the first image, a third setting of a third filter of the plurality of filters included in the filter array,
wherein the pixel array is caused to capture the second image according to the first setting of the first filter, the second setting of the second filter, and the third setting of the third filter.

17. The device of claim 12, wherein the filter array is formed from a liquid crystal layer that is disposed between the pixel array and an aperture of the camera, and
wherein the first filter is configured based on controlling a position of one or more liquid crystals, of the liquid crystal layer, that form the first filter.

18. The device of claim 12, wherein the second image comprises a high dynamic range image that is captured during a time period of a single exposure.

19. A non-transitory computer-readable medium storing a set of instructions, the set of instructions comprising:
one or more instructions that, when executed by one or more processors of a device, cause the device to:
receive, from a pixel array of a camera, a first image, wherein the first image is received and provided for display based at least in part on the camera being in a preview mode;
configure, based at least in part on the first image, a first setting of a first filter, of a plurality of filters included within a filter array;
receive a user input associated with a portion of the first image, the portion of the first image comprising less than an entire portion of the first image, the user input indicating an amount of attenuation to be applied to the portion of the first image;
configure, based at least in part on the user input, a second setting of a second filter, of the plurality of filters included in the filter array,
the second filter being associated with the portion of the first image,
the first setting being different from the second setting, and
the filter array being arranged within the camera in association with the pixel array; and
cause the pixel array to capture a second image.

20. The non-transitory computer-readable medium of claim 19, wherein the first image comprises a low dynamic range image and the second image comprises a high dynamic range image.

21. The non-transitory computer-readable medium of claim 19, wherein the first setting corresponds to a light attenuation level that is configured based at least in part on a characteristic of a light wave,
wherein the characteristic is indicated in the first image based at least in part on a pixel of the pixel array sensing the characteristic.

22. The non-transitory computer-readable medium of claim 19, wherein the one or more instructions further cause the device to:
configure, based at least in part on the first image, a third setting of a third filter of the plurality of filters included in the filter array,
wherein the pixel array is caused to capture the second image according to the first setting of the first filter, the second setting of the second filter, and the third setting of the third filter.

23. The non-transitory computer-readable medium of claim 19, wherein the filter array is formed from a liquid crystal layer that is disposed between the pixel array and an aperture of the camera, and
wherein the first filter is configured based on controlling a position of one or more liquid crystals, of the liquid crystal layer, that form the first filter.

24. The non-transitory computer-readable medium of claim 19, wherein the second image comprises a high dynamic range image that is captured during a time period of a single exposure.

25. An apparatus, comprising:
means for receiving, from a pixel array of a camera, a first image, wherein the first image is received and provided for display based at least in part on the camera being in a preview mode;
means for configuring, based at least in part on the first image, a first setting of a first filter, of a plurality of filters included within a filter array,
means for receiving a user input associated with a portion of the first image, the portion of the first image comprising less than an entire portion of the first image, the user input indicating an amount of attenuation to be applied to the portion of the first image;
means for configuring, based at least in part on the user input, a second setting of a second filter, of the plurality of filters included within the filter array,
the second filter being associated with the portion of the first image, the first setting being different from the second setting, and the filter array being arranged within the camera in association with the pixel array; and
means for causing the pixel array to capture a second image.

26. The apparatus of claim 25, wherein the first image comprises a low dynamic range image and the second image comprises a high dynamic range image.

27. The apparatus of claim 25, wherein the first setting corresponds to a light attenuation level that is configured based at least in part on a characteristic of a light wave,
wherein the characteristic is indicated in the first image based at least in part on a pixel of the pixel array sensing the characteristic.

28. The apparatus of claim 25, further comprising:
means for configuring, based at least in part on the first image, a third setting of a third filter of the plurality of filters included in the filter array,
wherein the pixel array is caused to capture the second image according to the first setting of the first filter, the second setting of the second filter, and the third setting of the third filter.

29. The apparatus of claim 25, wherein the filter array is formed from a liquid crystal layer that is disposed between the pixel array and an aperture of the camera, and
wherein the first filter is configured based on controlling a position of one or more liquid crystals, of the liquid crystal layer, that form the first filter.

30. The apparatus of claim 25, wherein the second image comprises a high dynamic range image that is captured during a time period of a single exposure.

* * * * *